US012725177B2

(12) United States Patent
Devesh et al.

(10) Patent No.: US 12,725,177 B2
(45) Date of Patent: Sep. 1, 2026

(54) SYSTEMS, METHODS, AND MEDIA FOR COMPARING VARIATIONS OF ELECTRONIC CONTENT IN RELATION TO A MEASURED METRIC AND/OR GENERATING A CAUSAL MODEL TO CALCULATE THE EFFECT OF AN INPUT VARIABLE ON A DESIRED OUTCOME

(71) Applicant: FMR LLC, Boston, MA (US)

(72) Inventors: Raj Devesh, Bangalore (IN); Ankit Ashok Baraskar, Pune (IN); Manish Worlikar, Flower Mound, TX (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/932,152

(22) Filed: Oct. 30, 2024

(65) Prior Publication Data

US 2026/0120136 A1 Apr. 30, 2026

(51) Int. Cl.
*G06Q 30/0203* (2023.01)
*G06Q 30/0251* (2023.01)

(52) U.S. Cl.
CPC ..... *G06Q 30/0203* (2013.01); *G06Q 30/0263* (2013.01)

(58) Field of Classification Search
CPC ....................... G06Q 30/0203; G06Q 30/0263
See application file for complete search history.

(56) References Cited

U.S. PATENT DOCUMENTS

| | | | | |
|---|---|---|---|---|
| 8,234,632 | B1 * | 7/2012 | Hugeback | G06Q 30/02 717/130 |
| 9,996,513 | B2 * | 6/2018 | Anderson | G06F 40/103 |
| 10,963,830 | B2 | 3/2021 | Li et al. | |
| 2016/0055236 | A1 * | 2/2016 | Frank | G06F 16/337 707/748 |
| 2016/0253311 | A1 * | 9/2016 | Xu | G06F 3/04842 715/256 |
| 2017/0083429 | A1 * | 3/2017 | Pekelis | G06F 11/3612 |

(Continued)

OTHER PUBLICATIONS

Wang, J.-H., Wu, Y.-T., & Wang, L. (2021). Predicting Implicit User Preferences with Multimodal Feature Fusion for Similar User Recommendation in Social Media. Applied Sciences, 11(3), 1064. https://doi.org/10.3390/app11/031064.*

(Continued)

*Primary Examiner* — Timothy Padot
(74) *Attorney, Agent, or Firm* — Cesari & McKenna, LLP

(57) ABSTRACT

In an embodiment, a feature that is different between variations of web-based electronic content can be determined to be a true and significant cause of a difference of a measured metric when three conditions are met. The three conditions may be satisfied when a probability value for a false positive is less than a false positive threshold value, a statistical power is greater than a statistical power threshold value, and a difference between mean values determined for distributions is greater than a mean threshold value. In a further embodiment, and when there is no control group, a causal model can be generated for different interventions or values related to a desired outcome. The causal model can be executed to determine which intervention is most impactful on the desired outcome and/or to determine an overall impact of a categorical variable on the desired outcome.

16 Claims, 9 Drawing Sheets

(56) References Cited

U.S. PATENT DOCUMENTS

| | | | | |
|---|---|---|---|---|
| 2017/0323329 | A1* | 11/2017 | Katariya ............ | G06Q 30/0244 |
| 2022/0129765 | A1* | 4/2022 | Lindon ............... | G06F 11/3688 |
| 2023/0076243 | A1 | 3/2023 | Watt et al. | |

OTHER PUBLICATIONS

Deng, A., Lu, J., Litz, J.: Trustworthy analysis of online A/B tests. In: Proceedings of the Tenth ACM International Conference on Web Search and Data Mining, WSDM 2017, pp. 641-649 (2017).*

P. Wang, M. Varvello and A. Kuzmanovic, "Kaleidoscope: A Crowdsourcing Testing Tool for Web Quality of Experience," 2019 IEEE 39th International Conference on Distributed Computing Systems (ICDCS), Dallas, TX, USA, 2019, pp. 1971-1982.*

Kay H. Brodersen, Alain Hauser, CausalImpact, Version 1.2.1, Licensed under the Apache License, Version 2.0. downloaded from the Internet <https://google.github.io/CausalImpact/CausalImpact.html> (Copyright © 2014-2017 Google, Inc.), 13 pages.

Causalinference 0.1.3 documentation » causalinference package » causalinference. utils package downloaded from the Internet <https://causalinferenceinpython.org/causalinference.utils.html>, (2016), 1 page.

* cited by examiner

500

| 505A | 505B | 505D | 505E | 505C | 505F |
|---|---|---|---|---|---|
| LOCATION | ADVISOR TENURE | EMAIL RECEIVED | CHAT DISCUSSION | ADVISOR SEGMENT | CURRENT SALES |
| NY | 3 yrs | YES | YES | DESK | 5000 |
| NV | 4 yrs | YES | NO | FIELD | 10000 |
| CA | 2 yrs | NO | NO | DESK | 4000 |
| TX | 5 yrs | YES | YES | UNSEGMENTED | 7000 |

FIG. 5

| SOURCE | OUTCOME METRIC | AVERAGE ARC STRENGTH |
|---|---|---|
| EMAIL RECEIVED | CURRENT SALES | 0.05 |
| CHAT DISCUSSION | CURRENT SALES | 0.24 |

SYSTEMS, METHODS, AND MEDIA FOR COMPARING VARIATIONS OF ELECTRONIC CONTENT IN RELATION TO A MEASURED METRIC AND/OR GENERATING A CAUSAL MODEL TO CALCULATE THE EFFECT OF AN INPUT VARIABLE ON A DESIRED OUTCOME

BACKGROUND

Technical Field

The present disclosure relates generally to electronic testing in a computing environment, and more specifically to techniques for comparing variations of electronic content in relation to a measured metric and/or generating a causal model to calculate the effect of an input variable on a desired outcome.

Background Information

Electronic A/B testing involves experimentally comparing different digital variations of electronic content (e.g., web pages, user interfaces, market models, drug formulations, etc.) to determine which version performs better in achieving predefined goals. This experimental method allows enterprises to systematically evaluate and compare differences in design, content, or functionality by exposing different versions of the data to different groups of users to determine if, for example, a particular characteristic or feature has a meaningful impact/influence (e.g., positive or negative) on users.

With the ever-increasing digital marketplace, the prevalence of electronic A/B testing has grown significantly for enterprises that, for example, operate in the digital world and want to maximize their growth and success. Specifically, properly implementing A/B testing can allow an enterprise to identify what digital content and/or strategies are most appealing to its customers, which in turn can allow the enterprise to make data-driven decisions for improving success in the marketplace. This can result in higher conversion rates, increased sales, improved user engagement, etc. Therefore, if properly implemented and understood, A/B testing can be a powerful tool that enterprises can use for growth and financial success.

However, effectively implementing A/B testing and properly understanding its results can be challenging. Firstly, A/B testing requires a foundational understanding of different statistical concepts (e.g., hypothesis testing, sample size determination, statistical power, etc.). Without this expertise and understanding, the A/B test may be incorrectly designed and there is an increased risk of data misinterpretation, which can lead to incorrect business decisions. Secondly, technical proficiency is required to properly set up A/B tests that are appropriate for the enterprise's business goals and its attributes/characteristics. For example, the interactions of the variations of the electronic content must be properly tracked and integrated with different software analytical tools to obtain meaningful results. Without proper setup, the results may be inconclusive or misleading.

As such, implementing A/B testing is no easy task and requires that users have a robust understanding of particular statistical principles and expertise in particular technical areas to truly leverage the power of A/B testing and understand the corresponding results.

Therefore, what is needed is a technique that facilitates the correct construction and implementation of electronic A/B testing without requiring extensive knowledge and expertise in statistical principles, technical areas, and other concepts that are required for conventional electronic A/B testing systems and methods.

Moreover, and in certain instances, categorical variables may impact outcomes in a variety of different ways. With conventional systems and techniques, extensive knowledge and expertise in statistical principles, technical areas, and other concepts are required to understand the relationships between different inputs and their combined and individual effects on a desired outcome. Therefore, what is needed is a technique for calculating, e.g., quantifying, the effect of each of a plurality of different values for an input variable on a desired outcome based on understanding the combined and individual effects of the plurality of different values on the desired outcome.

SUMMARY

Techniques for comparing variations of electronic content in relation to a measured metric and/or generating a causal model to calculate the effect of an input variable on a desired outcome.

In an embodiment, a software module (e.g., A/B testing software module) executed by a processor may receive A/B testing input information. The A/B testing input information may include information relating to at least two different versions of web-based electronic content, groups of users exposed to and interacting with the different versions, a metric to be measured between the groups of users, etc.

The software module may determine a type of variable corresponding to a feature that is different in the variations of the web-based electronic content and determine a distribution of the metric among at least a first group of users and a second group of users. The software module may identify and use a statistical test to compute a probability value for a false positive in performance of the electronic A/B testing. The software module may also compute a statistical power for the electronic A/B testing using a probability value of a false negative. The software module may further compute a mean value for each distribution determined for each group.

In an embodiment, the software module may determine that the difference in the measured metric between the two groups is significant and caused by the variation when three conditions are met. Specifically, the software module may determine that the difference in the measurement metric between the two groups is significant and caused by the variation when (1) the probability value for a false positive (e.g., p-value) is less than a false positive threshold value, (2) the statistical power is greater than a statistical power threshold value, and (3) the difference between the mean values determined for the distributions at step 240 is greater than a mean threshold value.

If the three conditions are not met, the software module can determine that a Bayesian statistical test should be used or that there is insufficient evidence to reject the null hypothesis.

In a different embodiment, a different software module (e.g., causal software module) executed by the processor may receive input information corresponding electronic testing that does not include a control group. The software module may generate a causal model based on the input information, where the causal model includes nodes for each of a plurality of different input variables, a node for at least one output variable, and directed edges between the input variables and output variable representing their inter-relationships. The software module may execute the causal model to identify one or more interventions that most positively impact a desired outcome or an overall impact of a categorical variable, which can have multiple values, on the desired outcome.

BRIEF DESCRIPTION OF THE DRAWINGS

The description below refers to the accompanying drawings, of which:

FIG. 5 is an illustration of an example table that includes example input information that may be received by the causal module 119 according to the one or more embodiments as described herein;

DETAILED DESCRIPTION OF AN ILLUSTRATIVE EMBODIMENT

Figure 1:
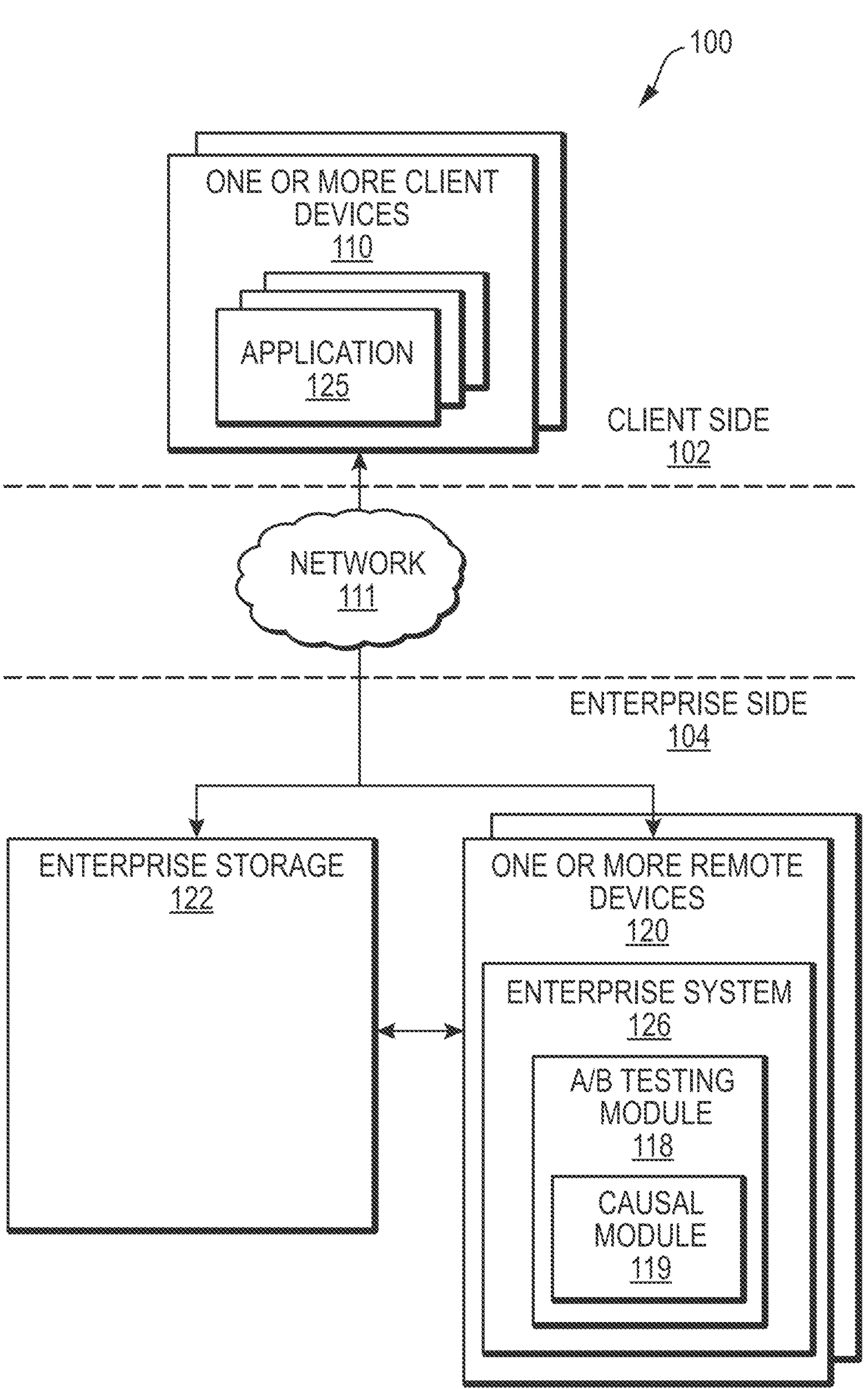
FIG. 1 is a high-level block diagram of an example system environment according to one or more embodiments as described herein.

FIG. 1 is a high-level block diagram of an example system environment 100 according to one or more embodiments as described herein. The system environment 100 may be divided into a client side 102 that includes one or more local client devices 110 that are local to end users, and an enterprise side 104 that includes one or more remote devices 120 and enterprise storage 122 that are remote from the end users. Enterprise side 104 may be managed, operated, and maintained by an enterprise. In an embodiment, the enterprise of enterprise 104 side may be a financial services institution.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of the enterprise. The client device 110 may also be operated by authorized personnel, e.g., employees of the enterprise, to perform enterprise functions. For example, client device 110 may download and execute application 125 that is provided by the enterprise. The execution of application 125 may allow customers and/or employees of the enterprise to implement one or more financial services functions.

The client device 110 may communicate with the enterprise system 126, managed/operated by the enterprise, over network 111. For example, a user may utilize application 125, executing on client device 110, to perform one or more functions at enterprise system 126 as will be described in further detail below.

Enterprise side 104 includes enterprise storage 122 that may store one or more data structures that may be generated or utilized according to the one or more embodiments as described herein. For example, enterprise storage 122 may store characteristic information associated with an enterprise, an electronic A/B test constructed for an enterprise, results from the constructed A/B testing, causal models, etc.

The enterprise side 104 also includes one or more remote devices 120 that may be one or more cloud-based devices and/or one or more server devices. The one or more remote devices 120 may store and execute enterprise system 126 that may implement the one or more embodiments as described herein. The enterprise system 126 may be accessible to its customers and/or authorized personnel, e.g., employees of the enterprise. The enterprise system 126 includes A/B testing module 118 and causal module 119 that may implement the one or more embodiments as described herein.

In an embodiment, only authorized personnel of the enterprise can execute the A/B testing module 118 and/or causal module 119 to implement the one or more embodiments as described herein.

For example, authorized personnel of the enterprise may utilize client device 110 to execute A/B testing module 118 and/or causal module 119 to implement one or more embodiments as described herein.

As will be described in further detail below, A/B testing module 118 may construct and implement an electronic A/B test for an enterprise based on enterprise specific information that may be provided by a user (e.g., employee) of the enterprise. Based on the provided information, the A/B testing module 118 may determine if three different conditions are met. If the three different conditions are met, the A/B testing module 118 may determine that a feature, which is different in variations of web-based electronic content, is the true cause of a significant difference in a metric measured between groups that utilize the variations.

Moreover, and as will be described in further detail below, causal module 119 may generate a causal model representing a plurality of different inputs and their individual and combined effects on an output variable that represents a desired outcome. The causal module 119 may execute, i.e., run, the causal model to determine which value for one of the input variables, which can have a plurality of different values, has the largest positive impact on the output variable. In an embodiment, the input variable may be a categorical variable and may represent an aggregation of a plurality of different values such that the execution of the causal model 600 can determine the overall impact of the input variable, having all the different values, on a desired outcome.

Figure 2A:
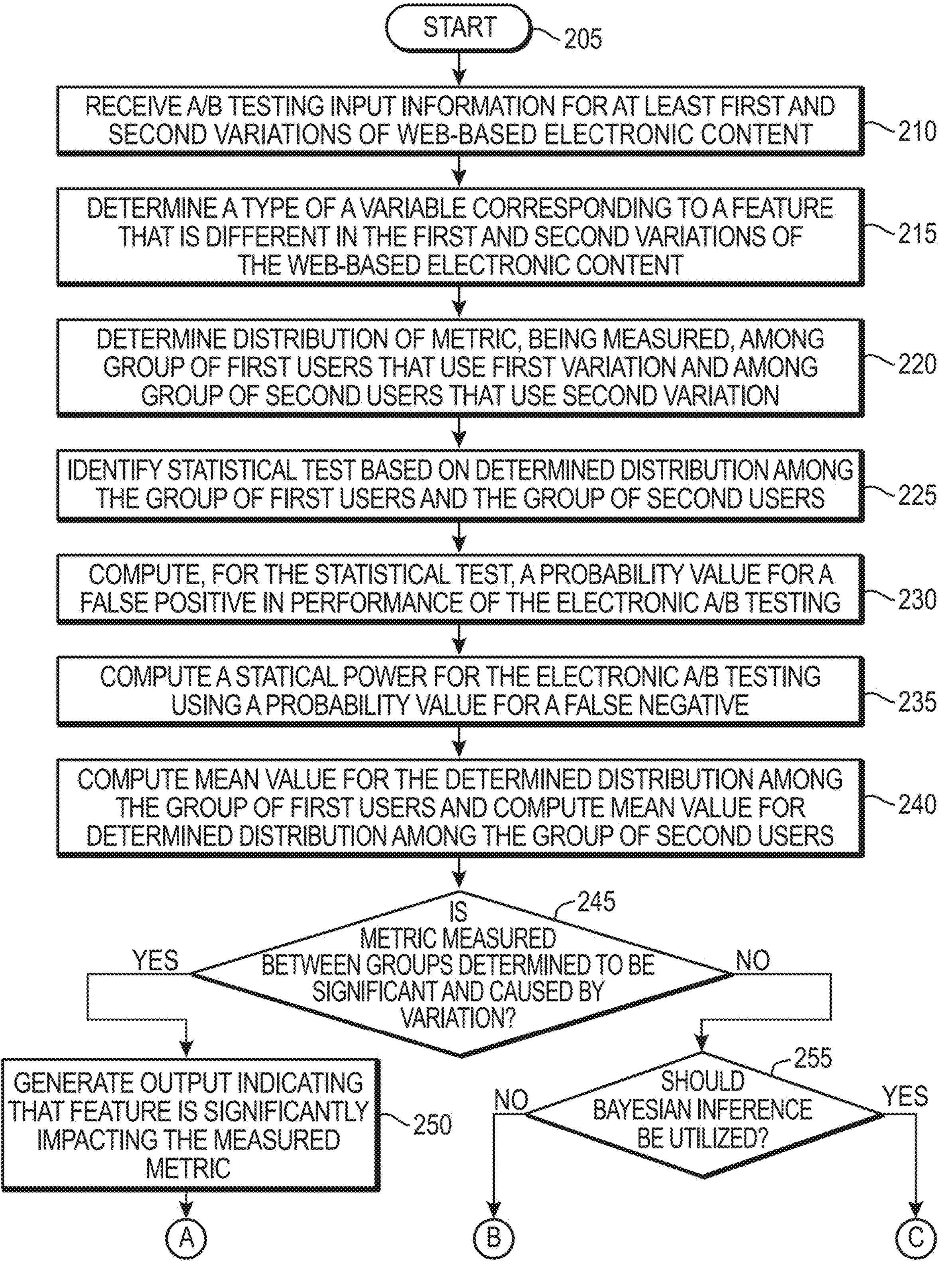
FIGS. 2A and 2B together constitute a flow diagram of a sequence of steps for constructing and implementing electronic A/B testing for variations of web-based electronic content according to the one or more embodiments as described herein.
Figure 2B:
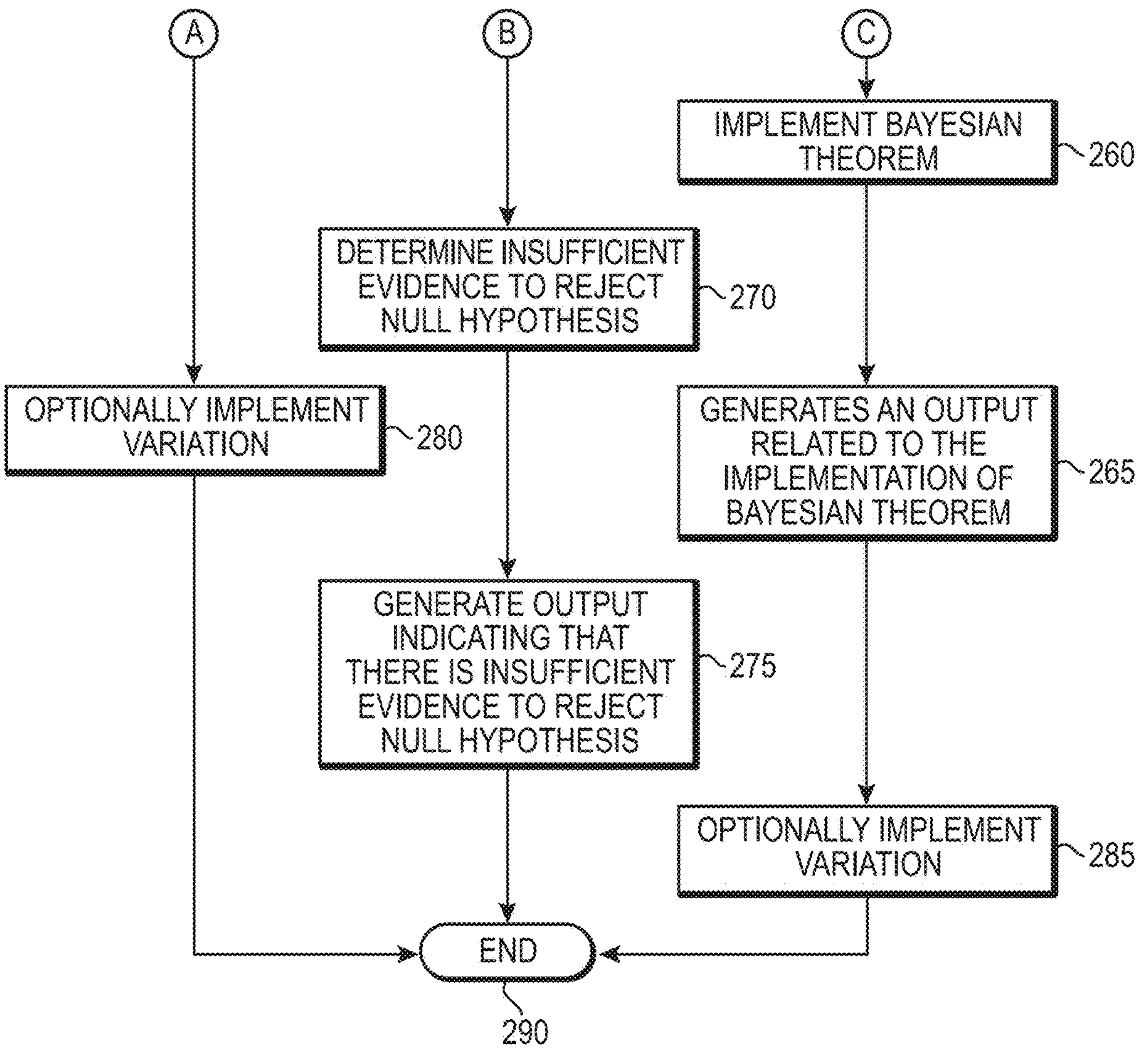

FIGS. 2A and 2B together constitute a flow diagram of a sequence of steps for constructing and implementing electronic A/B testing for variations of web-based electronic content according to the one or more embodiments as described herein.

The procedure of FIGS. 2A and 2B starts at step 205 and continues to step 210. At step 210, the A/B testing module 118 receives A/B testing input information for at least first and second variations of web-based electronic content. In an embodiment, the A/B testing module 118 may receive the A/B testing input information from a user operating client device 110. For example, an authorized user, e.g., an employee of the enterprise with particular credentials, may utilize application 125 executing on client device 110 to provide the A/B testing input information over network 111 to A/B testing module 118.

In an alternative embodiment, the A/B testing module 118 may receive the A/B testing input information by obtaining the A/B testing input information that is stored on enterprise storage 122.

In an embodiment, the A/B testing input information may describe different variations of electronic content and/or data corresponding to one or more users interacting with the different variations of the electronic content.

Figure 3A:
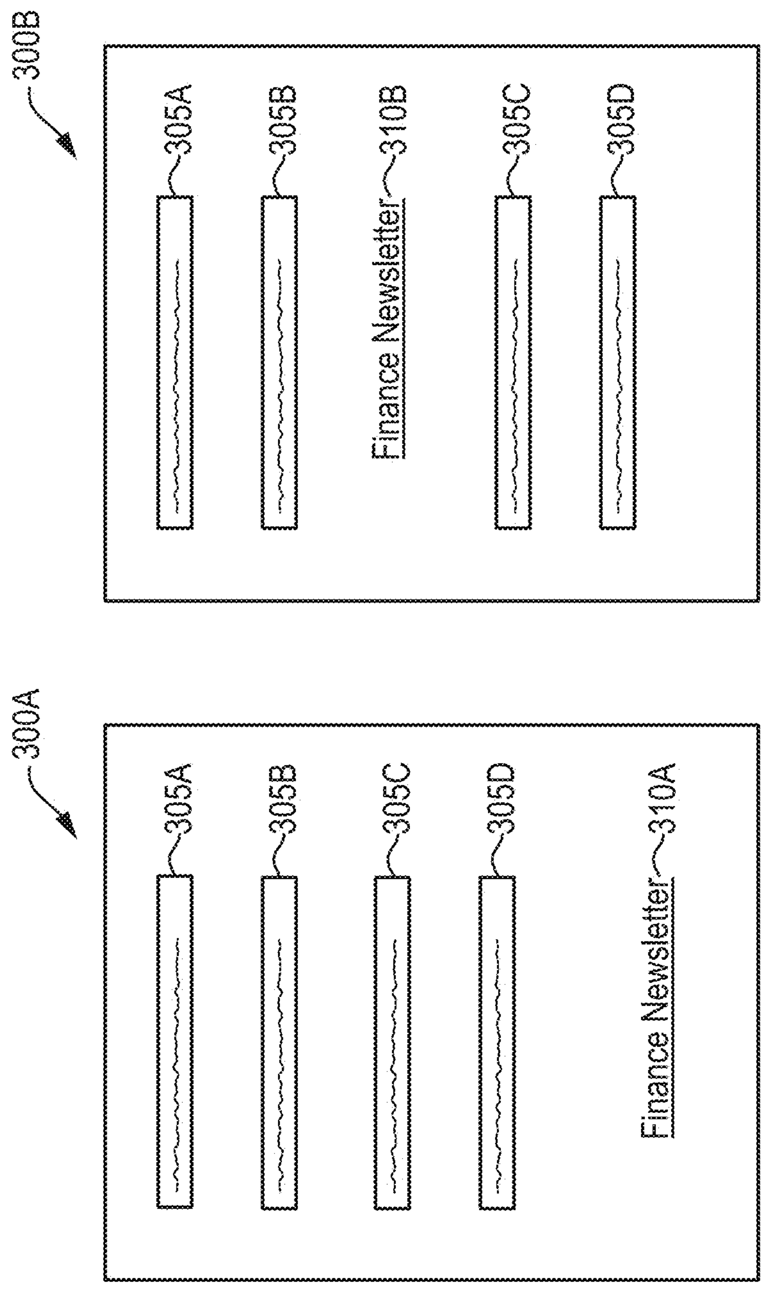
FIG. 3A is an illustration of two example variations of a financial services webpage that may be used for electronic A/B testing according to the one or more embodiments as described herein.

FIG. 3A is an illustration of two example variations of a financial services webpage that may be used for electronic A/B testing according to the one or more embodiments as described herein. For the non-limiting illustrative example of FIG. 3A, let it be assumed that the authorized user of the enterprise wants to construct and implement electronic A/B testing for two different variations of a financial services webpage to determine which variation would lead to better customer engagement, which in turn would have a positive impact on business growth and monetary gains.

The first variation of the financial services webpage 300A may be a current webpage used by the enterprise for its customers. Webpage 300A includes text portions 305A-305D that are in a horizontal layout with a hyperlink 310A for a financial services newsletter located at the bottom of the webpage 300A.

The second variation of the financial services webpage 300B is a new and different webpage that the enterprise may want to test to see if a particular feature in webpage 300B, which is different or not included in webpage 300A, causes a significant increase in a business metric (e.g., click through rate) that is meaningful to the enterprise. Webpage 300B may also include text portions 305A-305D that are in the horizontal layout, but hyperlink 310B for the financial services newsletter is located in the middle of webpage 300B. Therefore, the variation feature between webpages 300A and 300B is the location of the hyperlink.

As will be described in further detail below in relation to the flow diagram of FIGS. 2A and 2B, the A/B testing module 118 may perform electronic A/B testing to compare the two variations of the financial services webpage, e.g., webpages 300A and 300B, to determine if a particular feature that is different between the variations (e.g., location of the hyperlink) is a true cause of a significant increase in a measurement metric. The enterprise can then use and implement this feature which can result in business growth and monetization for the enterprise.

For this example, let it be further assumed that the user is interested in using click-through rate (CTR) as the metric for evaluating the variation of the location of the hyperlink between webpages 300A and 300B. In this example, CTR is a percentage of customers that are exposed to a hyperlink (e.g., 310A and 310B) and select the hyperlink that is included in webpages 300A and 300B. As such, and as will be described in further detail below, the one or more embodiments as described herein can determine if it is the location of the hyperlink in the webpage 300B that causes a meaningful and true impact on customers in terms of CTR, or whether a difference in CTR for the two variations is, for example, due to random chance or noise.

In an embodiment, the user may have access to tabular data that includes A/B testing input information corresponding to the two different variations that include webpages 300A and 300B. For example, the A/B testing input information included in the tabular data may include, but is not limited to, (1) the number of users in a first group (e.g., group A) that is exposed to and interacts with webpage 300A, (2) the number of users in a second group (e.g., group B) that is exposed to and interacts with webpage 300B, (3) characteristic information describing the layout and configuration of webpage 300A, (4) characteristic information describing the layout and configuration of webpage 300B, (5) interaction information indicating how each user interacted with webpages 300A and 300B (e.g., selecting a link, movement of cursor at particular locations, spending a certain amount of time on the webpage, etc.), (6) a metric to be measured, (7) an alternate hypothesis, and (8) a minimum significant difference.

The alternative hypothesis as described herein is a concept that is defined in relation to a null hypothesis that states that any difference in a measured metric between two groups (e.g., groups A and B), which are exposed to the variations of webpage 305A and webpage 305B, is due to random chance or noise. That is, the null hypothesis assumes that the difference in the measured metric between groups A and B is not caused by a variation in webpages 305A and 305B. Differently, the alternative hypothesis assumes that the difference in the measured metric between groups A and B is statistically significant and caused by a variation in webpages 305A and 305B. For the alternative hypothesis corresponding to the example as described herein, let it be assumed that the users of group A, which interact with webpage 300A, is the control group since webpage 300A is in current use for the enterprise. Further, let it be assumed that the users of group B, which interact with webpage 300B, is the treatment group since webpage 300B is a test webpage with a feature (e.g., hyperlink in a middle location) that is not currently in use but is hypothesized to potentially have a positive impact on the metric of CTR.

A minimum significant difference may be user defined and may indicate the minimum difference in the metric measured between the two groups that qualifies as being significant.

Continuing with the example, let it be assumed that 10,000 users constitute group A that are exposed to webpage 300A, and 10,000 users constitute group B that are exposed to webpage 300B. For this example, the minimum difference may be the minimum percentage difference in CTR, between groups A and B, which qualifies as being significant or valuable to the user/enterprise. As an illustrative example, let it be assumed that the enterprise determines that a 10% uptick or difference in CTR has a meaningful financial impact on the enterprise. Therefore, if the difference in CTR between group A and group B is determined to be less than 10%, the variations between webpages 300A and 300B are not significant enough in terms of CTR, and the enterprise would not consider the features of one webpage over the other. However, if the difference in CTR between groups A and B is determined to be equal to or greater than 10%, the variations between webpages 300A and 300B may be deemed to have a sufficiently significant impact on CTR, and the enterprise would conclude that it is worthwhile to consider one or more features of one webpage over the other.

With conventional systems and techniques, a user would be required to manually analyze the tabular data, with the knowledge of statistical principles and technical expertise, and make a myriad of assumptions to hypothesize if and to what extent each variation (e.g., layout, location of hyperlink, color scheme, etc.) of the web-based electronic content has a true correlation and meaningful impact on a metric that is deemed valuable. Therefore, and with conventional systems and approaches, users are required to have extensive knowledge and expertise in statistical principles, technical areas, and other concepts to accurately analyze the tabular data and come to a valid meaningful conclusion.

As will be described in further detail below in relation to the flow diagram of FIGS. 2A and 2B, the one or more embodiments as described herein overcome these deficiencies and allow for the automatic construction and implementation of electronic A/B testing by simply using the A/B testing input information that the user may have readily available. As a result, the one or more embodiments as described herein can determine if a variation feature between two versions of a webpage has a true and significant impact on a metric of choice. Accordingly, the one or more embodiments as described herein provide an improvement in the existing technological field of electronic A/B testing. That is, the one or more embodiments as described herein integrate the procedure of FIGS. 2A and 2B into the practical application of electronic A/B testing.

Figure 3B:
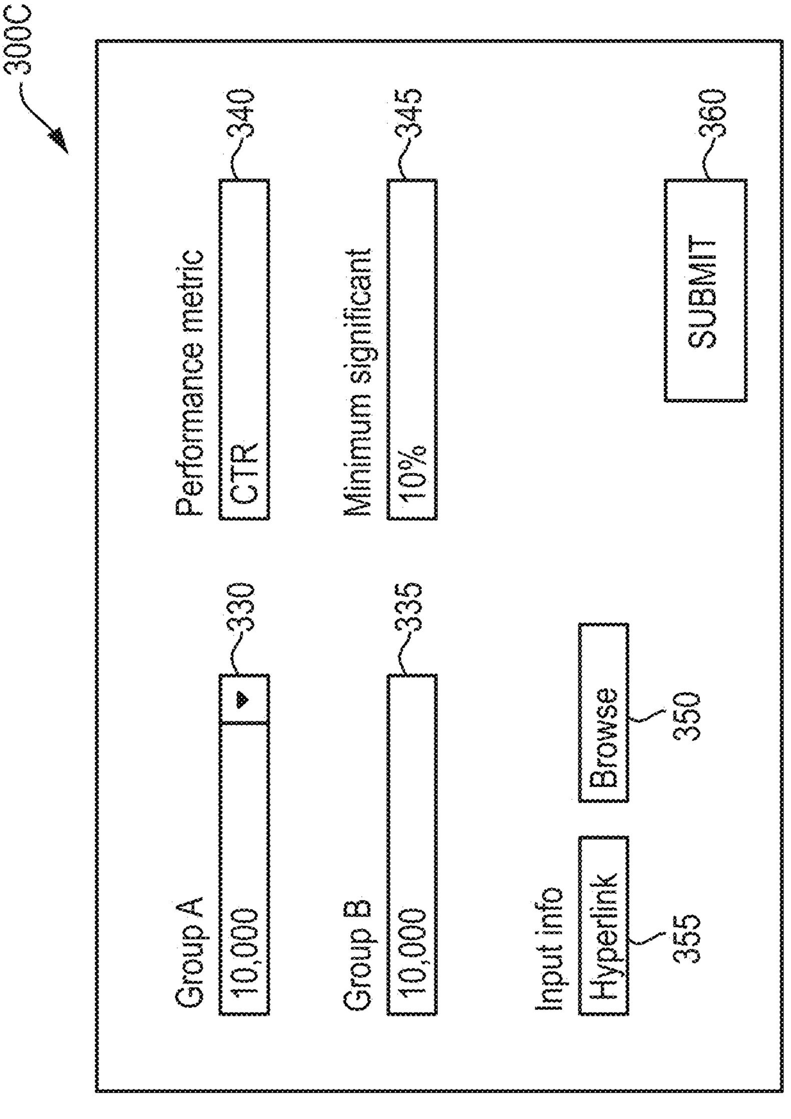
FIG. 3B is an example illustration of a graphical user interface that may be utilized to provide the A/B user input information according to the one or more embodiments as described herein.

FIG. 3B is an example illustration of a graphical user interface that may be utilized to provide the A/B user input information according to the one or more embodiments as described herein. The graphical user interface (GUI) 300C of FIG. 3B may be generated by A/B testing module 118 and provided over network 111 for display on client device 110.

As depicted in FIG. 3B, the GUI 300C includes fields 330 and 335 that allow the user of the enterprise, for example, to indicate the number of users in each of Groups A and B. In the example of FIG. 3C, the user has indicated that each of Groups A and B include 10,000 users.

Additionally, GUI 300C includes fields 340 and 345 that allow the user to indicate the metric (e.g., conversion rate, CTR, etc.) to be measured between the two groups and the minimum significant difference, respectively. In this example, the user has indicated that the metric that is to be measured between the two groups is CTR and the minimum significant difference for CTR between the two groups is 10%. Further, the user can upload other A/B input information (tabular data) that may be stored locally by selecting the browse button 350, identifying the location of the A/B input information stored locally such that field 355 is populated with the pathname. The user may then select the submit button 360 on GUI 300C to upload all the information, which was provided to GUI 300C, to the A/B testing module 118 over network 111.

Referring back to FIG. 2A, the procedure continues from step 210 to step 215. At step 215, the A/B testing module 118 determines a type of variable corresponding to a feature that is different in the first and second variations of the web-based electronic content. For the example as described herein, the feature that is different between webpages 300A and 300B is the location of hyperlinks 310A and 310B in the webpages 300A and 300B. Specifically, hyperlink 310A is located at the bottom of webpage 300A, while hyperlink 310B is located in the middle of webpage 300B. Therefore, and for this example, the A/B testing module 118 may determine that the type of variable, for the different locations of the hyperlink, is a categorical variable.

Although the example makes reference to a categorical variable, it is expressly contemplated that the one or more embodiments as described herein are applicable to any types of variables for any types of features. Such types of variables may include, but are not limited to, a binary variable, a categorical variable, a numerical variable, etc. In an embodiment, the A/B testing module 118 may determine the type of variable based on an analysis of the tabular data that includes information relating to the varying feature in the two versions of the webpage. As will be described in further detail below, the type of variable determined at step 215 may affect how the distributions for CTR among groups A and B are analyzed.

Referring back to FIG. 2A, the procedure continues from step 215 to step 220. At step 220, the A/B testing module 118 determines a distribution of the metric being measured among a first group of users that uses a first variation of the web-based electronic content and among a second group of users that uses a second variation of the web-based electronic content. Continuing with the example, the A/B testing module 118 determines the distribution of the CTR among the 10,000 users of group A that interact with webpage 305A that includes hyperlink 310A at the bottom of webpage 305A. Additionally, the A/B testing module 118 determines the distribution of the CTR among the 10,000 users of group B that interact with webpage 305B with hyperlink 310B in the middle of webpage 305B.

In an embodiment, the A/B testing module 118 may utilize any of a variety of different known methods to determine the distribution of CTR among the 10,000 users of group A and the distribution of CTR among the 10,000 users of group B.

The procedure continues from step 220 to step 225. At step 225, the A/B testing module 118 identifies a statistical test based on the distributions determined among the group of first users and second users. For this example, let it be assumed that there is a normal distribution for CTR among the 10,000 users of group A (e.g., control group). Further, let it be assumed that there is a normal distribution for CTR among the 10,000 users of group B (e.g., treatment group). Because there is a normal distribution for both groups A and B that interact with different variations of the webpage (e.g., webpages 305A and 305B), the A/B module 118 may determine that a z-test statistical test should be used to measure the statistical significance of the CTR difference across the two groups.

Although the example as described herein refers to identifying a z-test based on the determined distributions, it is expressly contemplated that the A/B testing module 118 may identify any of a variety of different statistical tests based on an analysis of the distributions among the two groups. For example, such statistical tests may include, but are not limited to, z-test, t-test, chi-square test, f-test, analysis of variance (ANOVA), etc.

The procedure continues from step 225 to step 230. At step 230, the A/B testing module 118 computes, for the statistical test, a probability value for a false positive in performance of the electronic A/B testing. In an embodiment, the probability value is known as a p-value for a false positive. According to the one or more embodiments as described herein, the A/B testing module 118 may calculate the p-value in any of a variety of different ways as known by those skilled in the art.

The p-value may quantify the strength against the null hypothesis, which is that the difference in the measured metric between the two groups is in fact caused by random chance or noise. In an embodiment, the p-value is a value between 0 and 1, where a decreasing p-value indicates a stronger likelihood against the null hypothesis, e.g., that the difference in the measured metric is in fact caused by the variation and is not caused by random chance or noise. Conversely, an increasing p-value indicates a stronger likelihood in the null hypothesis, e.g., that the difference in the measured metric is caused by random chance or noise and not caused by the variation between the web-based electronic content.

A false positive, or type I error, occurs when it is erroneously concluded that the variation between webpages 300A and 300B (e.g., location of the hyperlink in the middle instead of at the bottom) caused a significant difference in the measured metric (e.g., increase in CTR between groups A and B), when in fact the difference in the measured metric is due to random chance or noise.

Referring back to FIG. 2A, the procedure continues from step 230 to step 235. At step 235, the A/B testing module 118 computes a statistical power for the electronic A/B testing using a probability value for a false negative. In an embodiment, the probability value for a false negative may be referred to as a β-value. That is, the β-value represents the probability of the occurrence of a false negative. According to the one or more embodiments as described herein, the A/B testing module 118 may calculate the β-value in any of a variety of different ways as known by those skilled in the art.

In an embodiment, a false negative, or type II error, occurs when it is erroneously concluded that the variation between webpages 300A and 300B does not cause a significant difference in the measured metric (e.g., increase in CTR between groups A and B), when the variation did in fact cause a significant difference in the measured metric. A false negative may be caused by, for example, random variability in the data, factors that influence the calculated p-value that is not small enough to reject the null hypothesis, or other factors.

In an embodiment, the A/B testing module may compute the statistical power (SP) as SP=1−β-value. The statistical power may quantify the probability that the null hypothesis will be correctly rejected when it is false. To that end, a high SP value may indicate a low likelihood of a false negative occurring, while a low SP value may indicate a high likelihood of a false negative occurring.

The procedure continues from step 235 to step 240. At step 240, the A/B testing module 118 computes a mean value for the determined distribution among the group of first users and computes a mean value for the determined distribution among the group of second users. As explained above, the A/B testing module 118 at step 220 determines the distribution of the metric (e.g., CTR) among the group of first users that use webpage 300A, which is the first variation. Additionally, the A/B testing module 118 at step 220 determines the distribution of the metric (e.g., CTR) among the group of second users that use webpage 300B, which is the second variation.

According to the one or more embodiments as described herein, the A/B testing module 118 may determine the mean of each distribution determined for the two different groups of users that interact with the different variations of the web-based electronic content in any of a variety of different ways.

The procedure continues from step 240 to step 245. At step 245, the A/B testing module 118 determines if the metric, measured between the first group of users and the second group of users, is classified as significant and caused by a variation. In an embodiment, the A/B testing module 118 defines the difference in the measured metric (i.e., performance metric) to be significant (e.g., across the first group of users and the second group of users) and caused by the variation when three conditions are met. Specifically, the A/B testing module 118 defines the difference in the measured metric to be significant across the two groups and caused by the variation when (1) the probability value for a false positive (e.g., p-value) computed at step 230 is less than a false positive threshold value, (2) the statistical power computed at step 235 is greater than a statistical power threshold value, and (3) the difference between the mean values determined for the distributions at step 240 is greater than a mean threshold value.

That is, the A/B testing module 118 determines that if these three conditions are met, then it is likely (i.e., there is confidence) that the variation between the web-based electronic content is the true cause of a significant difference in the measured metric between the two groups. If all the three conditions are not met, the A/B testing module 118 cannot validate or conclude with certainty that the cause of the difference in the measured metric between the two groups is the variation and/or that the difference in the measured metric is significant. Instead, and when all three conditions are not met, the A/B testing module 118 determines that the cause of the difference in the measured metric between the two groups may be random chance or noise, and/or the difference in the measured metric is insignificant.

To that end, the first condition relates to the p-value computed at step 230 as described above. In an embodiment, the p-value is compared to a false positive threshold value that represents a predefined significance value. The threshold value may be 0.05 or some other value. When the p-value is less than the false positive threshold value (0.05), the A/B testing module 118 determines that the likelihood of a false positive occurring, e.g., the null hypothesis is incorrectly rejected when the null hypothesis is in fact true, is low. Therefore, satisfying the first condition ensures that the null hypothesis being incorrectly rejected is unlikely to occur.

The second condition relates to the statistical power computed at step 235 as described above. In an embodiment, the statistical power is compared to a statistical power threshold value that represents the probability of correctly identifying a variation as impacting a metric of choice (e.g., CTR). The threshold value may be 0.8 or some other value. When the statistical power is greater than the threshold value (0.8), the A/B testing module 118 determines that the likelihood of a false negative occurring, e.g., the null hypothesis is not rejected when the null hypothesis is in fact false, is low. Therefore, satisfying the second condition ensures that the null hypothesis being correctly rejected is likely to occur.

The third condition relates to the distribution determined for each group at step 240. In an embodiment, the difference in the mean values is compared to a mean threshold value that represents a minimum difference in the measured metric between the two groups that is acceptable to be classified as a significant difference. To that end, if the difference in the means is less than or equal to the mean threshold value, the A/B testing module 118 may determine that the difference in the measured metric (e.g., CTR) between the groups is not significant enough to justify or consider the variation of the treatment group (e.g., hyperlink in the middle of webpage 305B) over the control group (e.g., hyperlink at the bottom of webpage 305A). If the difference in the means is greater than the threshold value, the A/B testing module 118 may determine that the difference in the measured metric (e.g., CTR) between the groups is significant to justify or consider the variation of the treatment group (e.g., hyperlink in the middle of webpage 305B) over the control group (e.g., hyperlink at the bottom of webpage 305A).

Referring back to the example, let it be assumed that the A/B testing module 118 determines that hyperlink 310B being located at the middle of webpage 300B is likely the true cause of a significant (e.g., 10%) increase in CTR when compared to the control group (e.g., where hyperlink 310A is at the bottom of webpage 305A) if the three conditions as described above are met. That is, if the three conditions are met, the A/B testing module 118 determines that (1) the null hypothesis is unlikely to be incorrectly rejected when the null hypothesis is in fact true, (2) the null hypothesis is likely to be correctly rejected when the null hypothesis is in fact false (e.g., the variation is the true cause of the difference in the measured metric), and (3) the difference in the measured metric between the two groups is significant to the enterprise. As a result, the A/B testing module 118 determines that when the three conditions are met, there is high confidence in concluding that if the enterprise changes their webpage for its customers such that the hyperlink for the finance newsletter is in the middle of the webpage, the enterprise is likely to see an increase, i.e., uptick, in CTR of at least 10%.

If the A/B testing module 118 determines that the measured metric between the first group of users and the second group of users is caused by the variation and is significant (e.g., all three conditions are met), the procedure continues from step 245 to step 250. At step 250, the A/B testing module 118 generates an output indicating that the variation feature is significantly impacting the measured metric. For the example as described herein, the A/B testing module 118 may generate an output, which is displayed on the client device 100 that initiated the procedure of FIGS. 2A and 2B, indicating that the hyperlink 310B in the middle of webpage 305B significantly impacted the CTR when compared to the hyperlink 310A at the bottom of webpage 305A. In an embodiment, the output may indicate the amount of the determined significant improvement for the measured metric. For example, the output may indicate that if the webpage includes hyperlink 310B in the middle of the webpage, the CTR will increase by at least 10% or by a particular value such as 13%.

As a result, and according to the one or more embodiments as described herein, the user (e.g., authorized employee) can confidently conclude that it is advantageous for the enterprise, from a business and monetary standpoint, to switch from using webpage 305A to webpage 305B. That is, the user can confidently determine that if the enterprise's webpage includes the hyperlink for the finance newsletter in a middle location (e.g., not at the bottom), the CTR will increase by at least 10%, which in turn will result in increased revenue for the enterprise.

The procedure may optionally continue from step 250 to step 280. At step 280, the A/B testing module 118 may automatically implement the variation. In this example, the A/B testing module 118 may automatically update the financial services webpage to include the hyperlink in the middle location.

Therefore, the user need only provide the A/B testing input information to the A/B testing module 118 and the A/B testing module 118 can determine if a feature that is different between variations of web-based electronic content causes a significant improvement (i.e., uplift) in the metric that is measured between the two groups (e.g., control group and treatment group).

That is, and according to the one or more embodiments as described herein, the user need not know statistical principles and/or have expertise in technical areas to construct and implement an electronic A/B test. Therefore, constructing and implementing A/B testing as described herein in relation to FIGS. 2A and 2B allows enterprises to make the best business and financial decisions in relation to its web-based electronic content. Because the one or more embodiments as described herein are directly related to electronic A/B testing for web-based electronic content, the one or more embodiments as described herein are necessarily rooted in computer technology. That is, the one or more embodiments as described herein provide an improvement in the existing technological field of electronic A/B testing and the procedure of FIGS. 2A and 2B constitutes a practical application of an algorithm for electronic A/B testing.

Referring back to FIG. 2A, if the A/B testing module 118 determines that (1) the measured metric between the first group of users and the second group of users is not caused by the variation and/or (2) the metric measured between the groups is insignificant, the procedure continues from step 245 to step 255.

At step 255, the A/B testing module 118 determines if a Bayesian inference model should be utilized for the statistical test. The A/B testing module 118 determines that the Bayesian inference model should be utilized when only the first condition is met. Specifically, and for the three conditions as described above, the A/B testing module 118 only determines that it is unlikely that the null hypothesis will be incorrectly rejected. The A/B testing module 118 does not determine that the null hypothesis is likely to be correctly rejected and does not determine that the difference in the measured metric between the two groups is significant.

In this scenario, the A/B testing module 118 determines that the Bayesian inference model may be best suited to determine if the feature that is different in the variations of the web-based electronic content is the true cause of a significant improvement in the measured metric.

If the A/B testing module 118 determines that the Bayesian inference model should be utilized at step 255, the procedure continues from step 255 of FIG. 2A to step 260 of FIG. 2B. At step 260, the A/B testing module 118 implements the Bayesian Theorem. In an embodiment, the A/B testing module 118 obtains additional information, such as mean and variance values in relation to the measured metric (e.g., CTR). For example, the user utilizing the client device 110 that initiated the electronic A/B testing of FIGS. 2A and 2B may provide the additional information based on the user's existing knowledge.

The A/B testing module 118 may combine the A/B testing information (obtained at step 210) with the additional information, and use the combined information with the Bayesian Theorem to determine a key performance indicator (KPI) across the users of group A and group B. Based on the determined KPI, the A/B testing module 118 can compute a probability indicating that one variation (e.g., webpage 300A or webpage 300B) is better than the other. The A/B testing module 118 can also compute an expected error value indicating the likelihood that the computed probability is erroneous.

Continuing with the example, the A/B testing module 118 may implement the Bayesian Theorem using the A/B testing information for webpages 300A and 300B in combination with the additional statistical information (mean and variance values) for CTR among the users of groups A and B. Based on the implementation of the Bayesian Theorem, let it be assumed a KPI is determined, and the A/B testing module 118 determines that there is an 80% probability that webpage 300B is better than webpage 300A. Further, let it be assumed that the A/B testing module 118 determines, based on the implementation of the Bayesian Theorem, that the expected error, for the computed probability of 80%, is 5%. As such, there will be high confidence, on the order of 80% with a low expected error rate of 5%, that switching from webpage 300A (control) to the webpage 300B (treatment) will result in an increase in CTR.

The procedure continues from step 260 to step 265. At step 265, the A/B testing module 118 generates an output related to the implementation of the Bayesian Theorem. For example, the generated output, which may be displayed on client device 110, may include the probability value and the expected error value. The procedure may optionally continue from step 265 to step 285. At step 285, the A/B testing module 118 may automatically implement the variation. In this example, the A/B testing module 118 may automatically update the financial services webpage to include the hyperlink in the middle location.

If the A/B testing module 118 determines that the Bayesian inference model should not be utilized at step 255, the procedure continues from step 255 of FIG. 2A to step 270 of FIG. 2B. At step 270, the A/B testing module 118 determines that there is insufficient evidence to reject the null hypothesis (e.g., the first condition is not satisfied). Specifically, if all three conditions are not satisfied at step 245 and then at least the first condition is not satisfied at step 255, the A/B testing module 118 determines at step 270 that there is insufficient evidence to reject the null hypothesis. As a result, if there is a difference in the measured metric between the two groups, the A/B testing module 118 determines that the difference may be caused by random chance or noise.

The procedure continues from step 270 to step 275. At step 275, the A/B testing module 118 generates an output related to insufficient evidence to reject the null hypothesis. For example, the generated output, which may be displayed on client device 110, may indicate that the null hypothesis cannot be rejected and any difference in the measured metric between the two groups may be caused by random chance or noise. The procedure then ends at step 290.

Although the illustrative example that is used in relation to FIGS. 2A and 2B concerns the variation between two different webpages and the use of CTR as the metric to evaluate the variation, it is expressly contemplated that the one or more embodiments as described herein may be applicable to any types of variations of electronic content with any of a variety of different metrics. For example, the variations of the electronic content may include, but are not limited to, website versions, email subject line versions, electronic content location, etc. Additionally, the metrics may include, but are not limited to, CTR, conversion rate, time spent on a page, number of items purchased, etc. Additionally, the one or more embodiments as described herein may compare more than two variations. In an embodiment, and when more than two variations are compared, the A/B testing module 118 may identify ANOVA for the statistical test in step 225.

As described above in relation to FIGS. 2A and 2B, the alternative hypothesis is predicated on a defined control group and a different treatment group. However, in some instances of electronic testing a control group may not exist.

As a different illustrative example, let it be assumed that a set of financial advisors are targeted by email marketing and/or chat discussions for a particular financial product that may be electronically transmitted to the advisors. The email marketing and chat discussions may be referred to as different interventions corresponding to the delivery of the electronic content. It may be beneficial to determine which intervention is best suited for customer engagement. For example, it may be beneficial to determine which intervention results in the most increased revenue considering the characteristics of the advisors, external factors, and the inter-relationships between the interventions, characteristics, and external factors.

However, there is no control group for this type of scenario. According to the one or more embodiments as described herein, the causal module 119 may create and execute a causal model to accurately evaluate different interventions or an overall value of a categorical variable to evaluate the impact of the interventions and/or the categorical variable on a desired outcome, e.g., increase in revenue.

Figure 4:
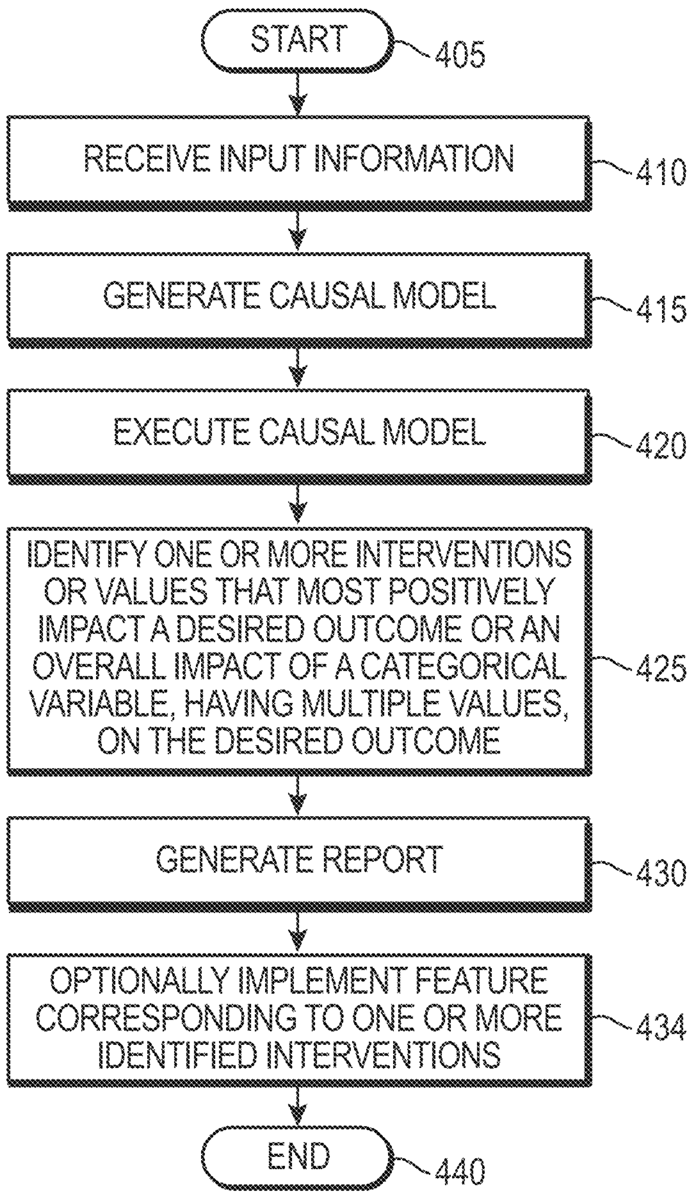
FIG. 4 is a flow diagram of a sequence of steps for generating and executing a causal model to evaluate a plurality of different interventions or an overall value for a categorical variable, related to electronic content, to determine the impact of at least one intervention or categorical variable on a desired outcome according to the one or more embodiments as described herein.

FIG. 4 is a flow diagram of a sequence of steps for generating and executing a causal model to evaluate a plurality of different interventions or an overall value for a categorical variable, related to electronic content, to determine the impact of at least one intervention or categorical variable on a desired outcome according to the one or more embodiments as described herein.

The procedure of FIG. 4 starts at step 405 and continues to step 410. At step 410, the causal module 119 receives input information related to different interventions or values. The input information of step 410 may be in tabular form and received in a similar manner as described above in relation to step 210 of FIG. 2A.

In an embodiment, the input information may include the type of different interventions used in offering one or more electronic products to users (e.g., financial advisors), which users were exposed to each of the interventions, historical information (e.g., characteristic information) associated with the users, revenue generated from the engagement with the user using the different interventions for the electronic product, external market conditions, etc. FIG. 5 is an illustration of an example table 500 that includes example input information that may be received by the causal module 119 according to the one or more embodiments as described herein.

In the table 500 of FIG. 5, each row may correspond to a different example advisor. Further, columns 505A-505C that are respectively titled "location", "advisor tenure", and "advisor segment" may be different characteristic information associated with each of the four different advisors in table 500 of FIG. 5. Columns 505D and 505E that are respectively titled "email received" and "chat discussion" may represent two example types of interventions used to offer an electronic product to an advisor, and the values in these columns may indicate whether the corresponding advisor received the intervention or not. For example, the electronic product may be financial portfolio software, a financial planning platform, customer relationship management system, a risk assessment tool, a trading platform, compliance and risk management software, etc. Column 505F, titled "current sales", may represent a desired outcome. Specifically, and in this example, the column 505F stores a value indicating the amount in sales, i.e., revenue, which was generated by offering the electronic product using one or more of the interventions.

For example, the advisor corresponding to the first row is located in New York and operates from his desk, has 3 years of service as an Advisor, and was offered the electronic product (e.g., electronic financial product) using email communication and chat discussions as the forms of customer engagement. Further, let it be assumed that $5,000 of revenue was generated over the last three months based on the advisor being offered the financial product, or a similar product, by way of email communication and/or chat discussion.

The advisor corresponding to the second row is located in Nevada and operates in the field, has 4 years of service as an Advisor, and was offered the financial product only using email as the form of customer engagement. Moreover, let it be assumed that $10,000 of revenue was generated over the last three months based on the advisor being offered the financial product, or a similar product, by way of email communication.

According to the one or more embodiments as described herein, the causal module 119 may use the values in table 500 of FIG. 5 to determine if a particular intervention is more successful than the other interventions based on the affect the interventions have on generated revenue. Specifically, and as will be described in further detail below in relation to FIG. 4, the causal module 119 may create a causal model to determine which form of intervention (e.g., electronic intervention of email communication or electronic chat discussion) is best for offering the electronic product in terms of generated revenue when considering the inter-relationships between the relevant information (e.g., characteristic information and/or external factors).

The procedure of FIG. 4 continues from step 410 to step 415. At step 415, the causal module 119 generates (i.e., creates) a causal model (e.g., directed graph) based on the received input information that includes the different types of interventions. Continuing with the example, causal module 119 may create a causal model based on the information in table 500 of FIG. 5 for the four different advisors.

Figure 6:
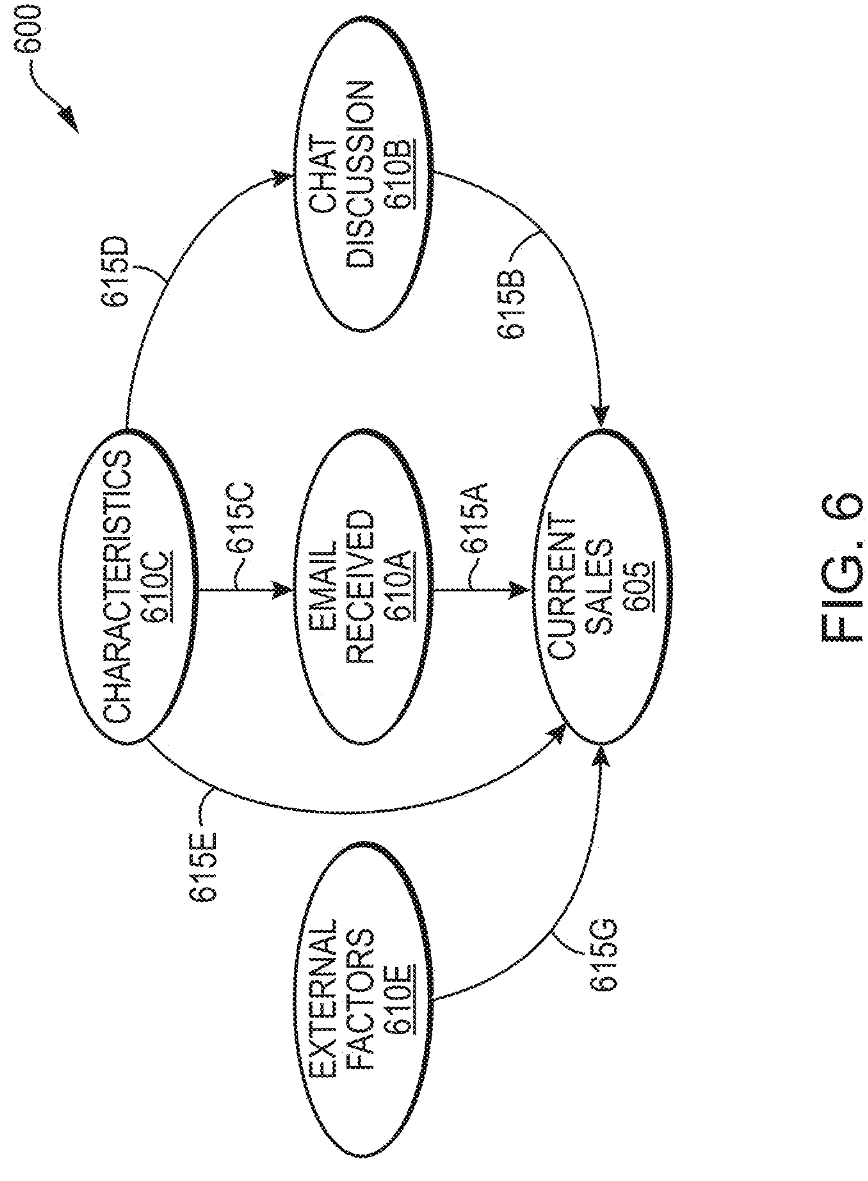
FIG. 6 is an illustration of an example causal model according to the one or more embodiments as described herein.

FIG. 6 is an illustration of an example causal model according to the one or more embodiments as described herein. In an embodiment, the causal module 119 generates the causal model 600 based on the information in table 500 of FIG. 5. Specifically, the causal module 119 creates node 605 for the desired outcome, which in this example is current sales, i.e., generated revenue. Node 605 may represent and store the values for current sales for each of the four advisors from column 505F in table 500 of FIG. 5. All the other nodes in the causal model directly or indirectly lead to node 605 using directed edges since node 605 represents the desired outcome.

The causal module 119 may create node 610A for the intervention of email communication that is used to offer the electronic product. Node 610A may represent and store the values from column 505D in table 500 of FIG. 5. The causal module 119 may create node 610B for the intervention of chat discussion that is used to offer the electronic product. Node 610B may represent and store the values from column 505E in table 500 of FIG. 5. The causal module 119 may also create directed edges 615A and 610B from each node representing the intervention to node 605 representing the desired outcome which, in this example, is current sales. Directed edge 615A may represent the direct relationship between the intervention of email communication and current sales. Directed edge 615B may represent the direct relationship between the intervention of chat discussion and current sales.

Additionally, the causal module 119 may create node 610C representing the characteristic information for the advisors in table 500 of FIG. 5. Node 610C may represent and store the values from columns 505A-505C in table 500 of FIG. 5. The causal module 119 may create a directed edge 615C from node 610C to node 610A representing the intervention of email communication. Directed edge 615C may represent the direct relationship between the characteristic information and the intervention of email communication.

Further, causal module 119 may create a directed edge 615D from node 610C to node 610B representing the intervention of chat discussion. Directed edge 615D may represent the direct relationship between the characteristic information and the intervention of chat discussion.

Moreover, the causal module 119 may create a directed edge 615E directly from node 610C, representing the characteristic information, to node 605 representing the current sales. Directed edge 615E may represent the direct relationship between the characteristic information and current sales.

The nodes 610A-610C and edges 615A-615E to node 605 together represent the different inter-relationships between the characteristic information, interventions used, and current sales.

Causal module 119 may also create node 610E representing external factors. Such external factors may include, but are not limited to, market conditions that may change with time. Causal module 119 may create edge 615G from node 610E to node 605 representing current sales. Node 610E and edge 615G to node 605 may represent the direct and isolated impact of the external factors on the current sales.

Therefore, the causal module 119 may create causal model 600 using the information from table 500 of FIG. 5. The causal model 600 may represent the inter-relationships between the various factors, where each directed edge represents or denotes a hypothesized causal impact flowing from a node at the tail-end of the directed edge to a different node at the head-end of the directed edge.

Referring back to FIG. 4, the procedure continues from step 415 to step 420. At step 420, the causal module 119 executes the causal model. In an embodiment, the causal module 119 executes the causal model, using the corresponding represented information, by executing multiple Bayesian regression models that calculate the Conditional Average Treatment Effect (CATE), which estimates the change at a particular node of a causal model, representing an output variable, given a change in one input variable while the other variables remain constant.

For example, the causal module 119 may fit a Bayesian regression model at each particular node of causal model 600 to determine a causal impact on the particular node by other nodes of the causal model based on the directed edges in the causal model. Based on fitting a Bayesian regression model at each node, a CATE may be calculated to estimate the change in revenue, which is represented by node 605, given a change in the values represented by one of nodes 610A-610E while the values represented by the other nodes of nodes 610A-610E remain the same.

For this example, let it be assumed that the causal module 119 executes multiple Bayesian regression models on causal model 600. As a result, the causal module 119 can isolate and determine the CATE for each intervention on current sales, which is represented by node 605 in causal model 600. The causal module 119 can then scale the CATE value, for each distribution, to get a relative arc strength. The relative arc strength may represent the positive causal effect of a particular intervention on current sales, while taking into account the inter-dependencies in causal model 600 that are represented by the directed edges.

Specifically, the causal module 119 can isolate and determine the CATE for each of email communication and chat discussion based on executing multiple Bayesian regression models as described above. The causal module 119 may then scale the CATE value for email communication. The CATE value that is scaled may be referred to as an arc strength. The arc strength may represent an estimation of the positive impact that email communication has on current sales for the electronic product considering the dependencies (e.g., between characteristic information, external factors, types of interventions, and current sales) represented in causal model 600 by the directed edges.

For this example, let it be assumed that the arc strength for email communication is 0.05. The causal module 119 may also scale the CATE value for chat discussion. The CATE value that is scaled may be referred to as an arc strength and may represent an estimation of the positive impact that chat discussion has on current sales considering the inter-relationships (e.g., between characteristic information, external factors, types of interventions, and current sales). For this example, let it be assumed that the arc strength for chat discussion is 0.24.

In an embodiment, a plurality of arc strengths for a categorical variable, which can take on multiple values (e.g., 2 or more), can be aggregated using a weighting factor to calculate an overall arc strength for the categorical variable. For example, let it be assumed that a categorical variable can take on three values. The causal module 119 may execute a causal model, which is generated in the manner described above, to calculate the arch strength for each of the three values for the categorical variable. For this example, let it be assumed that the three arc strengths are 0.1, 0.2, and 0.1 for the example categorical variable. The causal module 119 may multiply each arch strength by a corresponding weighting factor and compute three weighted arc strengths and then aggregate (e.g., sum) the three weighted arc strengths to calculate an overall arc strength for the categorical variable. The overall arc strength for the categorical variable may indicate the overall impact that an input variable, e.g., categorical variable, has on the desired outcome when the input variable takes on the three different values. That is, the overall arc strength for the categorical variable can quantify the impact of the input variable on the desired outcome based on the particular values for the input variable that are specific to the enterprise.

For example, let it be assumed that the categorical variable represents a group of advisors at a firm, where each advisor can have an operating behavior of desk, field, or unsegmented. The causal module 119 may determine the arc strength for each unique transition from one value to a different value (e.g., desk to field, desk to unsegmented, field to desk, field to unsegmented, unsegmented to desk, unsegmented to field) at the firm in a similar manner as described above and based on the execution of a causal model.

Each of the six arc strength values may be multiplied by a corresponding weight that represents the likelihood of the particular transition at the firm to generate a weighted arc strength value. The six weighted arc strength values may be summed together to compute an overall arc strength that represents the group of advisors at the firm on the generated revenue.

Referring back to FIG. 4, the procedure continues from step 420 to step 425. At step 425, the causal module 119 identifies one or more interventions or values that most positively impact a desired outcome or an overall impact of a categorical variable, having multiple values, on the desired outcome. For the example as described herein, it is determined that chat discussion most positively impacts current sales.

The procedure continues from step 425 to step 430. At step 430, the causal module 119 may generate a report. In an embodiment, the report may include an indication regarding the intervention and their impact on the desired outcome and/or the impact the categorical variable, which can have different values, has on the desired outcome.

Figure 7:
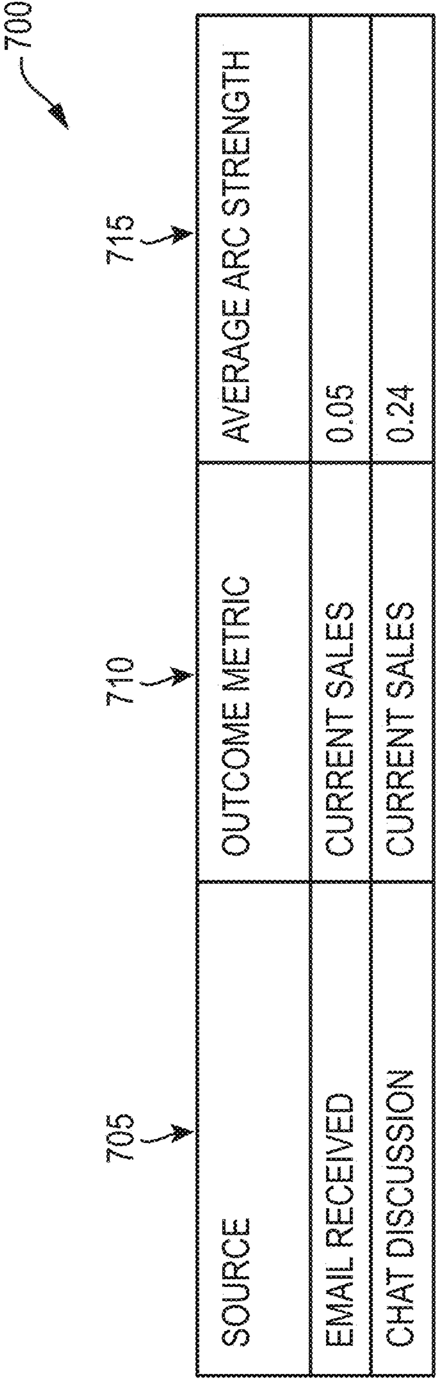
FIG. 7 is an example of a report that may be generated for a plurality of different interventions based on the execution of a causal model according to the one or more embodiments as described herein.

FIG. 7 is an example of a report that may be generated for a plurality of different interventions based on the execution of a causal model according to the one or more embodiments as described herein. Report 700 may include a row for each intervention being evaluated, which, in this example, is email communication and chat discussion. Column 705 may store an identifier for the particular intervention. Column 710 may store a value indicating the desired outcome for which the intervention was analyzed. For the example as described herein, the different forms of customer engagement were evaluated in terms of current sales, e.g., generated revenue. Column 715 may store a value indicating the arc strength that is determined based on the execution of the causal model 600. As such, a user can utilize the report to determine the impact that each intervention has on desired outcome. Therefore, the report 700 can indicate that based on the based on the execution of the causal model 600, that chat discussion engagement is approximately five times as effective as email communication in driving current sales for the electronic product or similar electronic products.

The procedure continues from step 430 to step 435. At step 435, the causal module 119 optionally implements a feature corresponding to the one or more identified intervention or corresponding to the categorical variable. For the example as described herein, the causal module 119 may automatically transition all electronic communications for the electronic product from email communication to chat discussions.

According to the one or more embodiments as described herein, the user need not know statistical principles and/or have expertise in technical areas to construct and implement an electronic test to determine which interventions are best for delivering electronic content. Instead, a user can simply provide high-level information characteristic information, external factors, and information regarding the interventions to accurately determine which interventions, for electronic content, are best from a business growth and financial standpoint. Because the one or more embodiments as described herein are directly related to electronic testing for different types of interventions related to electronic content, the one or more embodiments as described herein are necessarily rooted in computer technology. That is, the one or more embodiments as described herein provide an improvement in the existing technological field of electronic testing and the procedure of FIG. 4 constitutes a practical application of an algorithm for electronic testing.

It should be understood that a wide variety of adaptations and modifications may be made to the techniques. For example, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic executable instructions stored in a non-transitory electronic device-readable medium, as well as one or more hardware components. Above all, it should be understood that the above description is meant to be taken only by way of example.

What is claimed is:

1. A computer implemented method for performing A/B testing for a first variation of web-based electronic content and a second variation of the web-based electronic content, the method comprising:

receiving, from a client device operated by a user, A/B testing input information for the first variation of the web-based electronic content and the second variation of the web-based electronic content, wherein the first variation of the web-based electronic content is utilized by a first group of a plurality of first users for the A/B testing and the second variation of the web-based electronic content is utilized by a second group of a plurality of second users for the A/B testing;

determining, based on the A/B testing input information, a type of a variable corresponding to a feature that is different in the first variation of the web-based electronic content and the second variation of the web-based electronic content;

determining a distribution of a performance metric among the plurality of first users and among the plurality of second users, wherein the performance metric is related to the variable corresponding to the feature;

identifying a statistical test based on the determined distribution among the plurality of first users and the plurality of second users;

computing, for the statistical test, a first probability value for a false positive in performance of the A/B testing;

computing, for the statistical test, a second probability value for a false negative in performance of the A/B testing;

subtracting, for the statistical test, the second probability value from 1 to produce a statistical power for the A/B testing;

computing a first mean value for the distribution of the performance metric among the plurality of first users and a second mean value for the distribution of the performance metric among the plurality of second users;

defining a difference in the performance metric, across the first group utilizing the first variation and the second group utilizing the second variation, as significant when (1) the first probability is less than a first threshold value, (2) the difference between the first mean value and the second mean value is greater than a second threshold value, and (3) the statistical power is greater than a third threshold value;

detecting, by a software module executed by a processor of a computing device, that (1) the first probability is less than the first threshold value, (2) the difference between the first mean value and the second mean value is greater than the second threshold value, and (3) the statistical power is greater than a third threshold value; and automatically updating, by the software module and in response to the detecting, a web page to include the web-based electronic content with the feature.

2. The computer implemented method of claim 1, further comprising:

determining that the first variation of the web-based electronic content and the second variation of the web-based electronic content have a same or negligible impact on the first group and the second group when the difference in the performance metric is not defined as being significant.

3. The computer implemented method of claim 1, wherein the A/B testing input includes (1) a selection of the performance metric of a plurality of different performance metrics, (2) identification of the first variation of the electronic web-based content, identification of the second variation of the electronic web-based content, and identification of the first group and the second group, (3) the second threshold value, and (4) an expected outcome from the A/B testing.

4. The computer implemented method of claim 1, wherein the performance metric is one of clicks per session, a session duration, or conversion rate.

5. The computer implemented method of claim 1, wherein the type of the variable is a binary variable, a categorical variable, or a numerical variable.

6. The computer implemented method of claim 1, wherein the false positive occurs when a null hypothesis, for the A/B testing for the first variation and second variation of the electronic web-based content, is incorrectly rejected when the null hypothesis is true, wherein the null hypothesis represents that there is no meaningful difference in the distributions among the plurality of first users and the plurality of second users.

7. The computer implemented method of claim 1, wherein the false negative occurs when a null hypothesis, for the A/B testing for the first variation and the second variation of the electronic web-based content, is not rejected when the null hypothesis is false, wherein the null hypothesis represents that there is no meaningful difference in the distributions among the plurality of first users and the plurality of second users.

8. The computer implemented method of claim 1, further comprising:

determining that a Bayesian inference model should be utilized as the statistical test when (1) the first probability is less than the first threshold value, (2) the difference between the first mean value and the second mean value is not greater than the second threshold value, and (3) the statistical power is not greater than the third threshold value.

9. The computer implemented method of claim 1, further comprising:

determining that a null hypothesis should be rejected when the first probability is greater than or equal to the first threshold value.

10. The computer implemented method of claim 1, wherein the first threshold value is 0.05 and the third threshold value is 0.8.

11. The computer implemented method of claim 1, wherein the statistical test is one of a t-test, a chi-Square test, a z-test, an analysis of variance (ANOVA), a regression analysis, or a Bayesian test.

12. The computer implemented method of claim 1, further comprising:

determining that the statistical power does not meet a statistical power threshold value;

obtaining, based on determining that the statistical power does not meet the statistical power threshold value, a performance metric mean value and one or more performance metric variance values;

using the A/B test input information, the performance metric mean value, and the one or more performance metric variance values with a Bayesian Theorem to determine a key performance indicator (KPI) across the first group and the second group;

determining a better probability value indicating that the first variation is superior to the second variation or the second variation is superior to the first variation; and determining an expected error that the better probability value is incorrect.

13. A system for performing A/B testing for a first variation of electronic web-based content and a second variation of the electronic web-based content, the system comprising:

a memory;

a processor coupled to the memory, the processor executing a software module configured to:

receive, from a client device operated by a user, A/B testing input information for the first variation of the electronic web-based content and the second variation of the electronic web-based content, wherein the first variation of the electronic web-based content is utilized by a first group of a plurality of first users for the A/B testing and the second variation of the electronic web-based content is utilized by a second group of a plurality of second users for the A/B testing;

determine, based on the A/B testing input information, a type of a variable corresponding to a feature that is different in the first variation of the electronic web-based content and the second variation of the electronic web-based content;

determine a distribution of a performance metric among the plurality of first users and among the plurality of second users, wherein the performance metric is related to the variable corresponding to the feature;

identify a statistical test based on the determined distribution among the plurality of first users and the plurality of second users;

compute, for the statistical test, a first probability value for a false positive in performance of the A/B testing;

compute, for the statistical test, a second probability value for a false negative in performance of the A/B testing;

subtract, for the statistical test, the second probability value from 1 to produce a statistical power for the A/B testing;

compute a first mean value for the distribution of the performance metric among the plurality of first users and a second mean value for the distribution of the performance metric among the plurality of second users;

define a difference in the performance metric across the first group utilizing the first variation and the second group utilizing the second variation as significant when (1) the first probability is less than a first threshold value, (2) the difference between the first mean value and the second mean value is greater than a second threshold value, and (3) the statistical power is greater than a third threshold value; and detect that (1) the first probability is less than the first threshold value, (2) the difference between the first mean value and the second mean value is greater than the second threshold value, and (3) the statistical power is greater than a third threshold value; and automatically update, in response to the detecting, a web page to include the electronic web-based content with the feature.

14. The system of claim 13, wherein the software module is further configured to:

that the first variation of the electronic web-based content and the second variant of the electronic web-based content have a same or negligible impact on the first group and the second group when the difference in the performance metric is not defined as being significant.

15. The system of claim 13, wherein the A/B testing input includes (1) a selection of the performance metric of a plurality of different performance metrics, (2) identification of the first variant of the electronic web-based content, identification of the second variant of the electronic web-based content, and identification of the first group and the second group, (3) the second threshold value, and (4) an expected outcome from the A/B testing.

16. The system of claim 13, wherein the performance metric is one of clicks per session, a session duration, or conversion rate.

* * * * *